(12) United States Patent
Kuromizu

(10) Patent No.: US 8,944,661 B2
(45) Date of Patent: Feb. 3, 2015

(54) LIGHTING DEVICE, DISPLAY DEVICE, AND TELEVISION DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 13/814,742

(22) PCT Filed: Jul. 5, 2011

(86) PCT No.: PCT/JP2011/065376

§ 371 (c)(1),
(2), (4) Date: Feb. 7, 2013

(87) PCT Pub. No.: WO2012/023353

PCT Pub. Date: Feb. 23, 2012

(65) Prior Publication Data

US 2013/0135538 A1    May 30, 2013

(30) Foreign Application Priority Data

Aug. 18, 2010   (JP) .................................. 2010-182671

(51) Int. Cl.
*F21V 8/00* (2006.01)
*G02F 1/1335* (2006.01)

(52) U.S. Cl.
CPC ............ *G02B 6/0035* (2013.01); *G02B 6/0031* (2013.01); *G02B 6/0091* (2013.01); *G02F 1/133615* (2013.01); *G02B 6/0068* (2013.01); *G02B 6/0073* (2013.01)
USPC ........................................... 362/609; 349/65

(58) Field of Classification Search
USPC ............ 362/609, 612, 613, 611, 600; 349/65, 349/62, 113, 67
See application file for complete search history.

(56) References Cited

U.S. PATENT DOCUMENTS

| | | |
|---|---|---|
| 2007/0159064 A1 | 7/2007 | Choi et al. |
| 2009/0059117 A1 | 3/2009 | Shinozaki et al. |
| 2010/0156274 A1 | 6/2010 | Kim et al. |
| 2012/0223660 A1 | 9/2012 | Choi et al. |

FOREIGN PATENT DOCUMENTS

| | | |
|---|---|---|
| JP | 07-038154 A | 2/1995 |
| JP | 07-193281 A | 7/1995 |
| JP | 11-320962 A | 11/1999 |
| JP | 2003-347600 A | 12/2003 |

(Continued)

OTHER PUBLICATIONS

Official Communication issued in International Patent Application No. PCT/JP2011/065376, mailed on Oct. 18, 2011.

*Primary Examiner* — Elmito Breval
(74) *Attorney, Agent, or Firm* — Keating & Bennett, LLP

(57) ABSTRACT

Uneven brightness is less likely to be caused and good display quality is achieved. A lighting device includes a plurality of light emitting units each of which includes a base board and a plurality of light emitting components on the base board, a linear light source including the plurality of light emitting units that are arranged linearly, a light guide member having an end portion and provided such that the end portion faces the linear light source, a reflection sheet configured to reflect light from the linear light source, and a reflection cover provided close to the light guide member and corresponding to a gap that is generated between the light emitting units.

20 Claims, 23 Drawing Sheets

(56) References Cited

FOREIGN PATENT DOCUMENTS

| | | |
|---|---|---|
| JP | 2005-228535 A | 8/2005 |
| JP | 2006-310221 A | 11/2006 |
| JP | 2008-198460 A | 8/2008 |
| JP | 2009-058768 A | 3/2009 |
| JP | 2009-158233 A | 7/2009 |
| JP | 2009-301728 A | 12/2009 |
| JP | 2010-087267 A | 4/2010 |
| JP | 2010-093304 A | 4/2010 |
| JP | 2010-144170 A | 7/2010 |

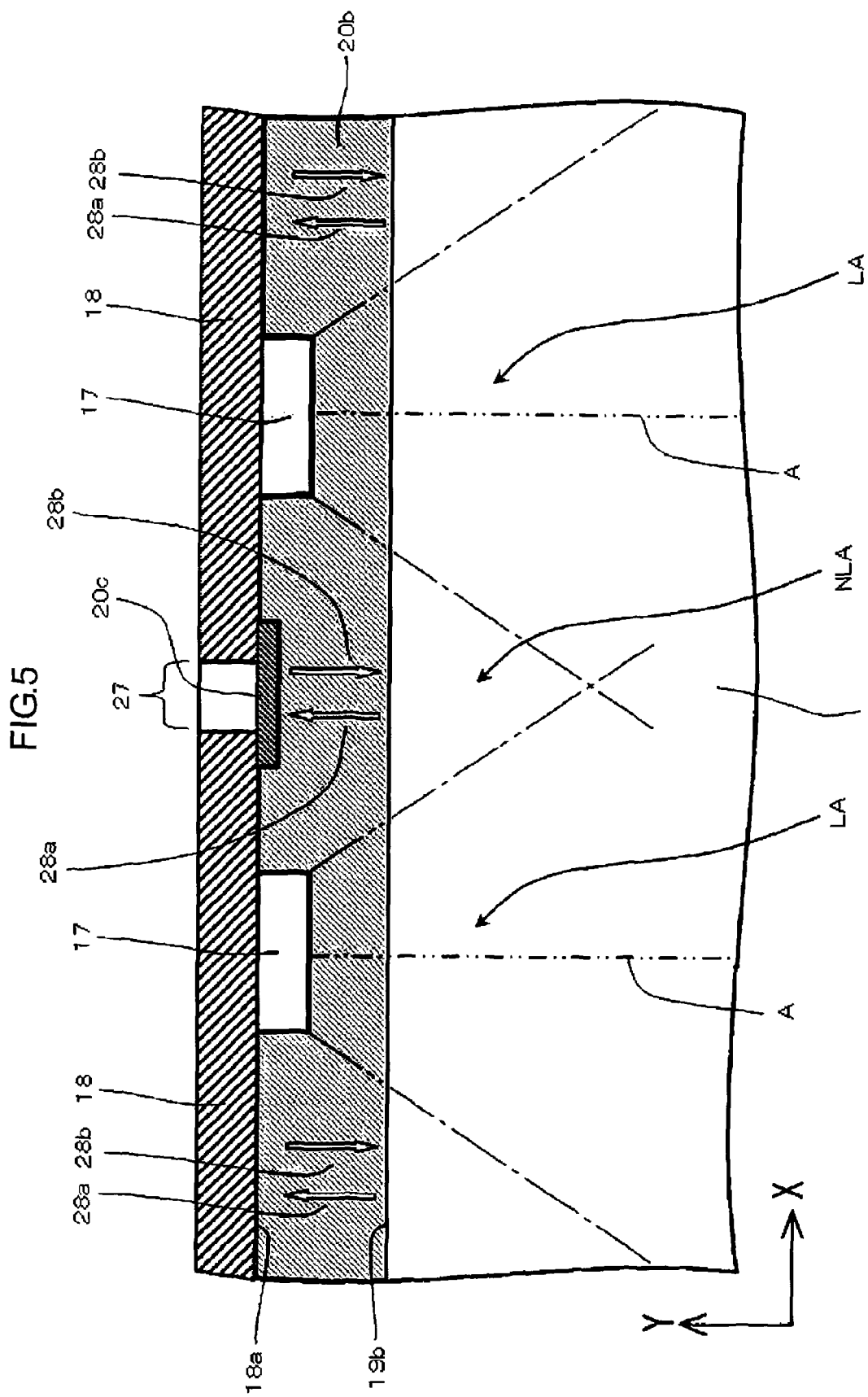

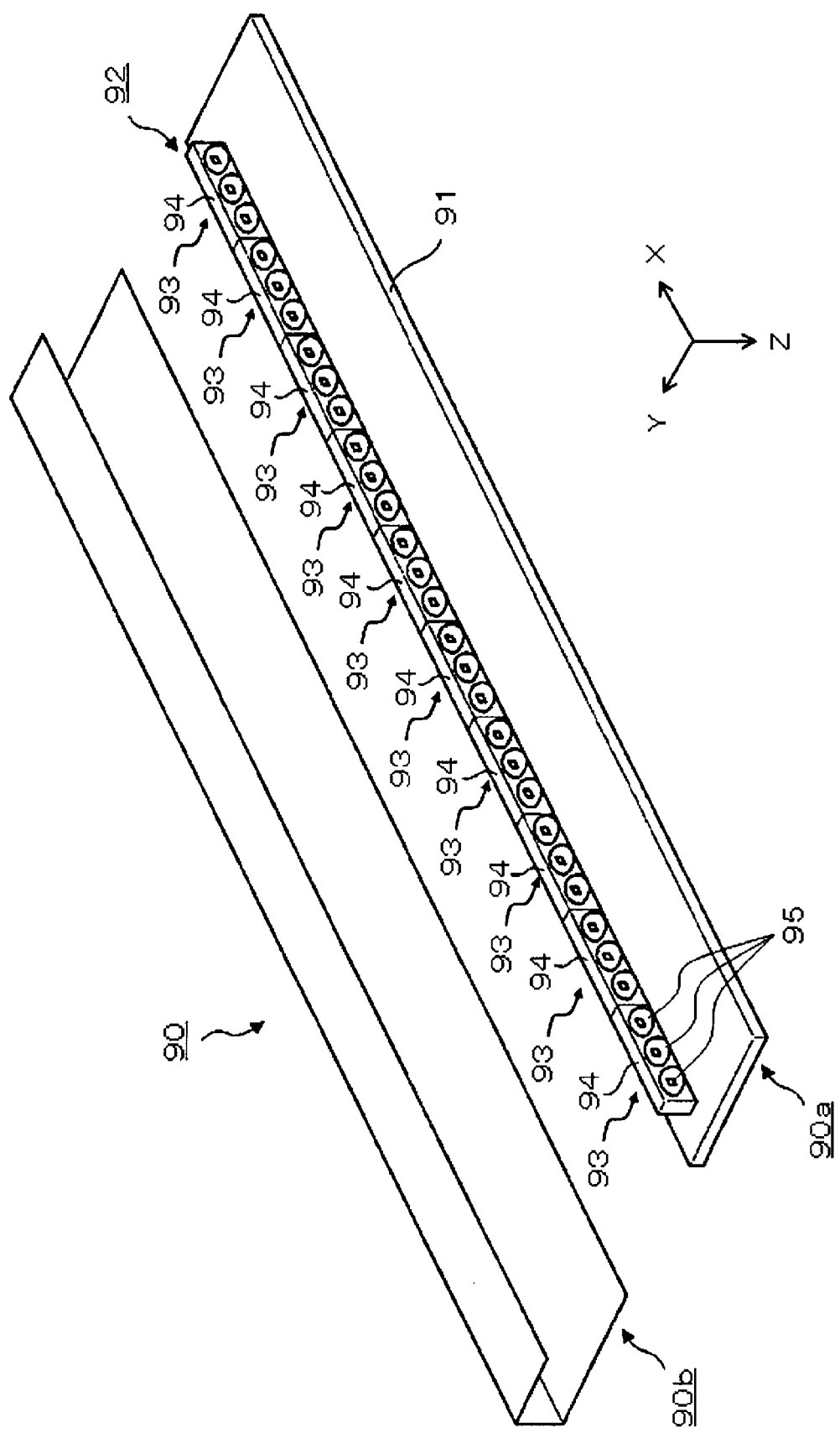

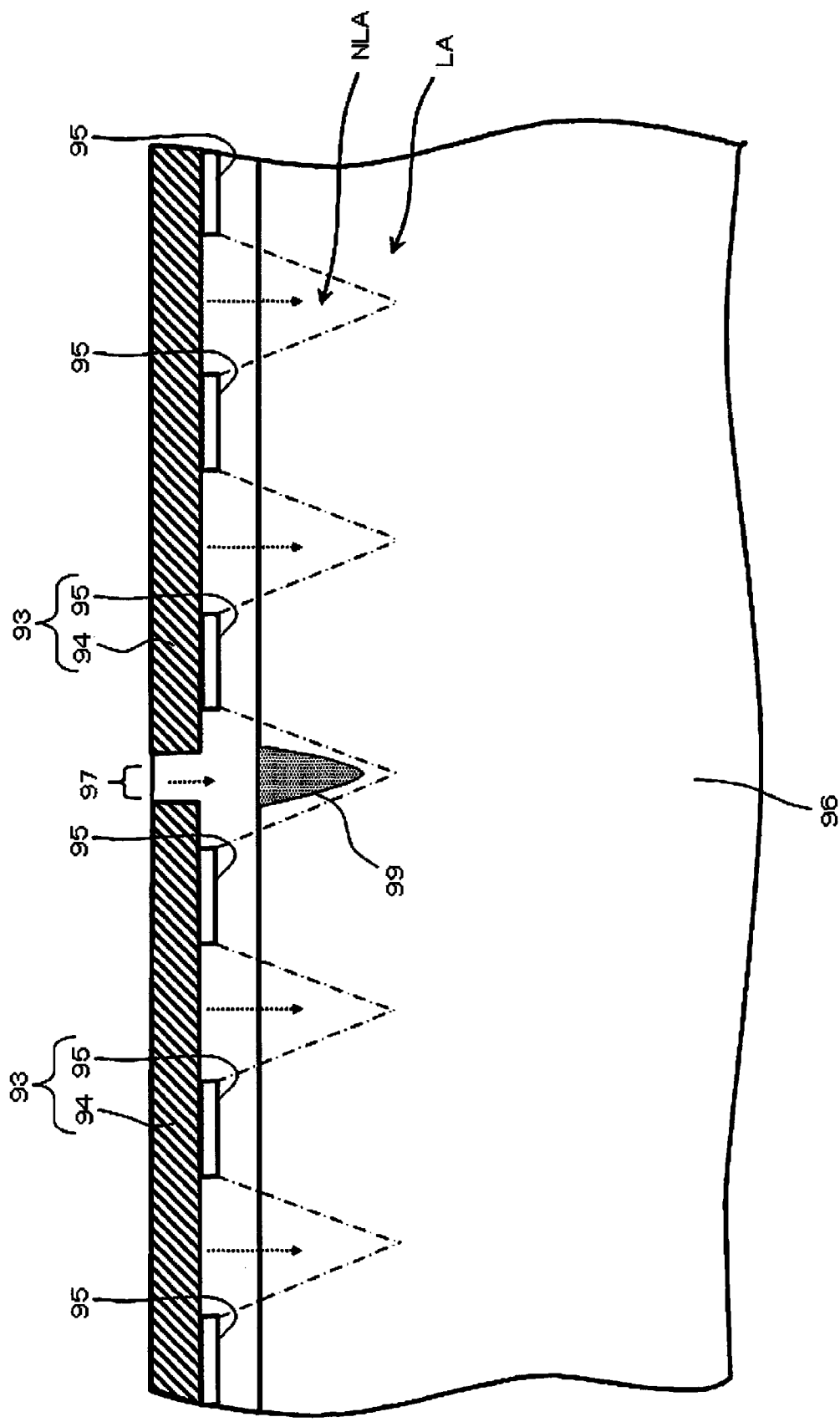

LIGHTING DEVICE, DISPLAY DEVICE, AND TELEVISION DEVICE

TECHNICAL FIELD

The present invention relates to a lighting device, a display device, and a television device.

BACKGROUND ART

A transmsmissive or semi-transmissive liquid crystal display device includes a liquid crystal display panel and a backlight unit provided on a rear-surface side of the liquid crystal display panel.

An edge-light type backlight unit has been known as the backlight unit. The edge-light type backlight unit includes a linear light source and a light guide member. The linear light source includes a base board and a plurality of LED (light emitting diode) chips that are mounted linearly on the base board. The light guide member is formed of a transparent plate member such as acrylic resin. The linear light source is arranged along an end surface of the light guide member to configure the backlight unit.

Patent Document 1 discloses such an edge-light type backlight unit. As illustrated in FIG. 11, the edge-light type backlight unit includes a light emission portion 92 and a wiring board 91. The light emission portion 92 includes a plurality of light emission modules 93 and the light emission modules 93 are arranged on the wiring board 91. Each light emission module 93 includes a mount board 94 and LEDs 95 that are mounted on a surface of the mount board. Each mount board 94 is arranged on the wiring board 91 such that main surfaces are perpendicular to each other.

According to the backlight unit disclosed in Patent Document 1, warping caused in the mount board is less likely to have influences compared to a configuration in which the light emission portion is configured with one long light emission module. Therefore, the LEDs 95 mounted on and fixed to each mount board 94 so as to face the light guide member, and unevenness in the light amount is less likely to occur in the liquid crystal display device.

Patent Document 1: Japanese Unexamined Patent Application Publication No. 2009-58768

Problem to be Solved by the Invention

In the edge-light type backlight unit disclosed in Patent Document 1, as illustrated in a plan view of FIG. 12, the light guide member 96 has a lighting area LA and a non-lighting area NLA in the vicinity of a light entrance surface. Light from each LED 95 directly enters the lighting area LA and light indirectly enters the non-lighting area NLA from its surroundings. The light reflects off the surface of the mount board 94 and enters the non-lighting area NLA and this makes up the light amount in the non-lighting area NLA. However, if a gap 97 is provided between the mount boards 94 as is in Patent Document 1, a light reflectance is decreased in the gap 97 and this reduces the amount of light reflecting and being guided toward the light guide member 96. Therefore, the non-lighting area NLA facing the gap 97 causes a dark portion 99, and uneven brightness is recognized at edge portions of a display area.

DISCLOSURE OF THE PRESENT INVENTION

The present invention was accomplished in view of the foregoing circumstances. An object of the present technology is to provide a lighting device including a plurality of light emission modules as a light source in which uneven brightness is less likely to be caused and display quality is improved.

Means for Solving the Problem

A lighting device includes a plurality of light emitting units each of which includes a base board and a plurality of light emitting components on the base board, a linear light source including the plurality of light emitting units that are arranged linearly, a light guide member having an end portion and provided such that the end portion faces the linear light source, a reflection sheet configured to reflect light from the linear light source, and a reflection cover provided close to the light guide member and corresponding to a gap that is generated between the light emitting units.

Advantageous Effect of the Invention

According to the present technology, in a lighting device including a plurality of light emission modules as a light source, uneven brightness is less likely to be caused and display quality is improved.

BRIEF DESCRIPTION OF THE DRAWINGS

FIG. 5 is a plan view illustrating a reflection sheet including a reflection cover according to a modified embodiment;

FIG. 11 is a light emitting device of a related art in which a plurality of light emission units are arranged in adjacent to each other; and FIG. 12 is a plan view explaining uneven brightness in the light emitting device of the related art.

MODE FOR CARRYING OUT THE INVENTION

A first embodiment of the present technology will be explained with reference to FIGS. 1 to 7. In the present embodiment, a liquid crystal display device 10 will be described as an example. An X-axis, a Y-axis and a Z-axis are described in a part of some drawings and each of the axial directions corresponds to a direction illustrated in each drawing. The Y-axis direction corresponds to a vertical direction and the X-axis direction corresponds to a horizontal direction. Without any notification, "upper" and "lower" are described with respect to the vertical direction. An upper side in FIG. 2 is a front-surface side and a lower side in FIG. 2 is a rear-surface side.

FIRST EMBODIMENT

Figure 1:
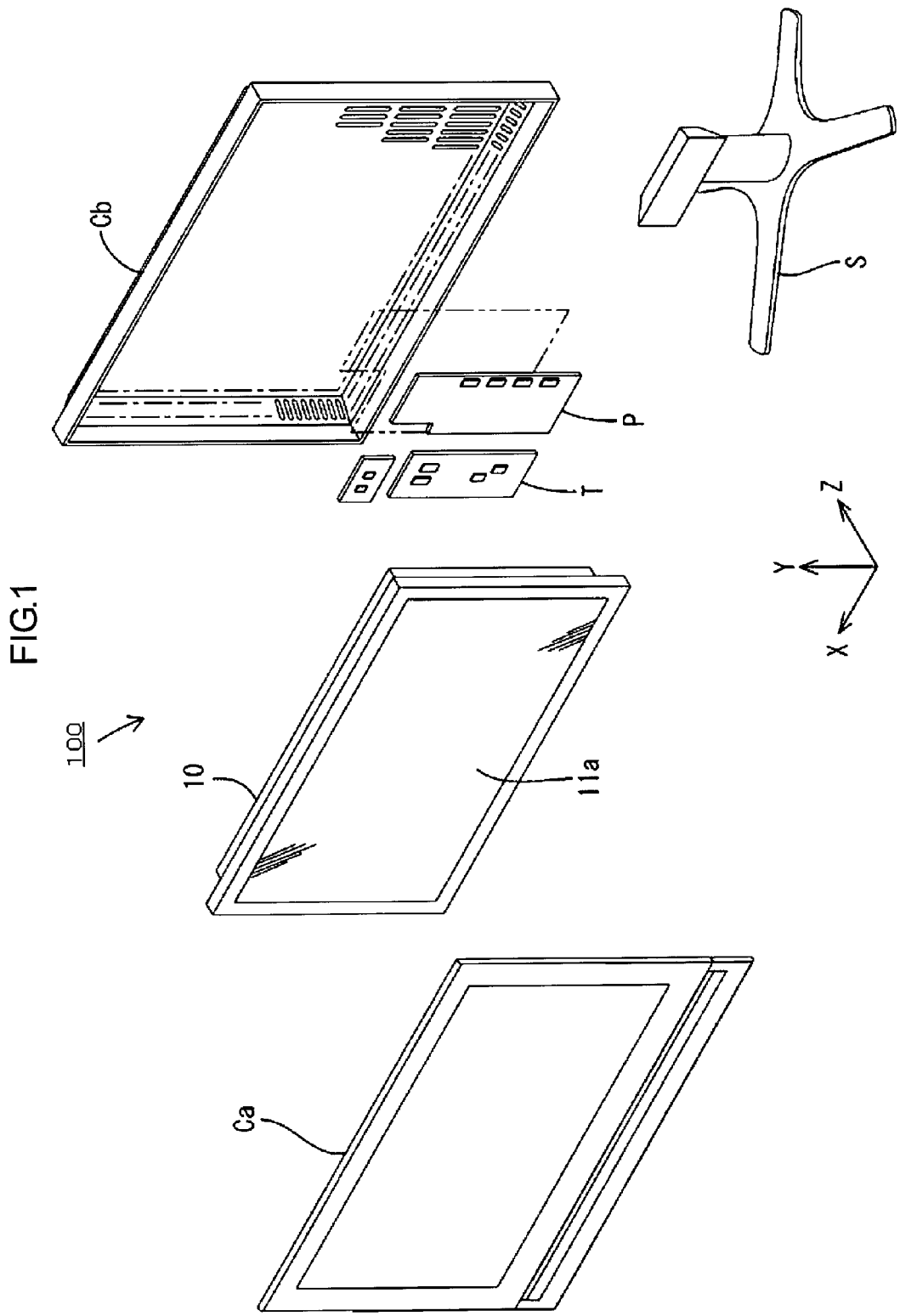
FIG. 1 is an exploded perspective view illustrating a general construction of a television device of the present technology.
Figure 2:
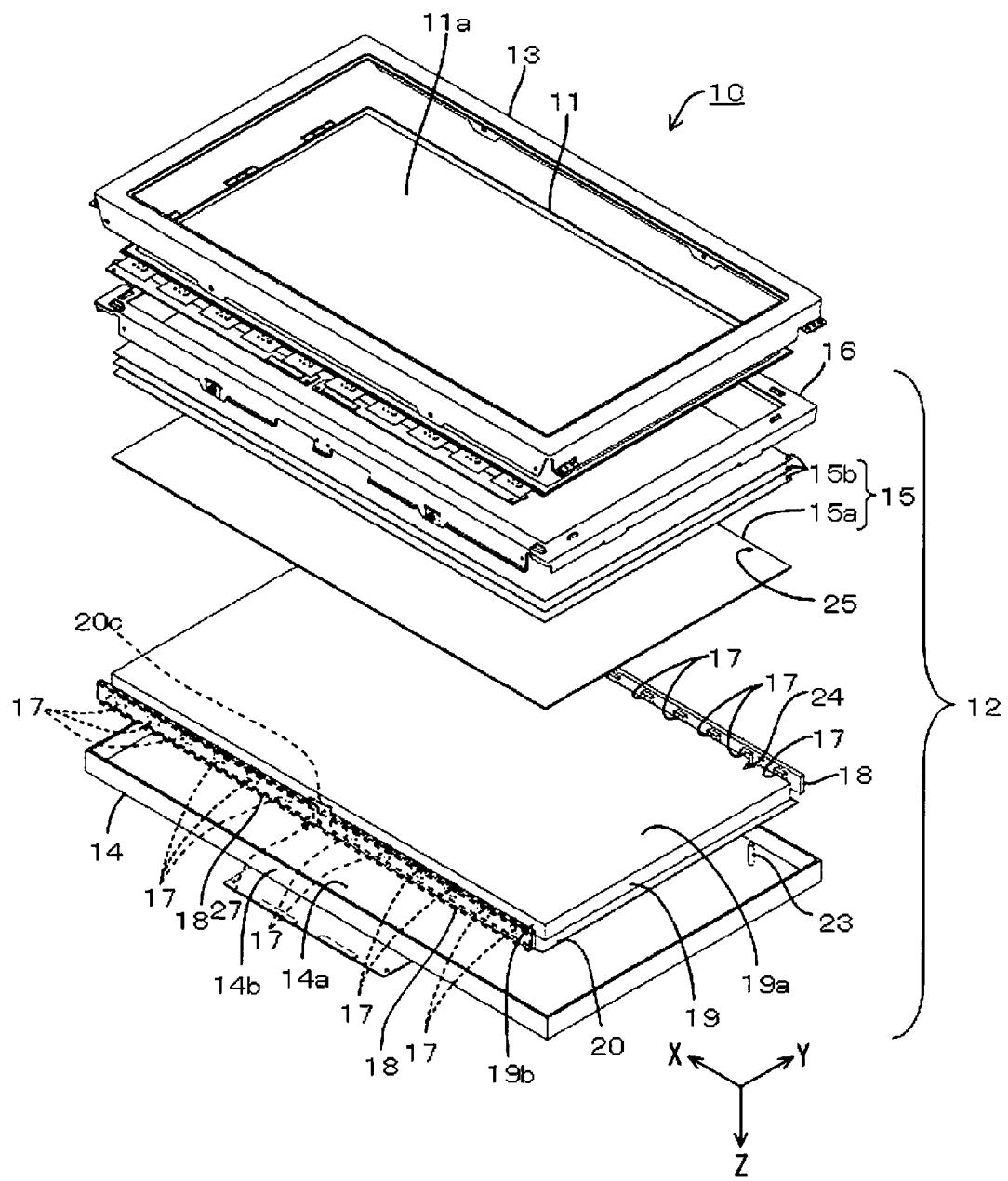
FIG. 2 is an exploded perspective view illustrating a general construction of a liquid crystal display device included in the television device.

FIG. 1 is an exploded perspective view illustrating a general construction of a television device of the present technology. As illustrated in FIG. 1, a television device 100 of the present embodiment includes a liquid crystal display device 10, a front and rear cabinets Ca, Cb that sandwich the liquid crystal display device 10 therebetween, a power source P, a tuner T, and a stand S. The liquid crystal display device 10 (a display device) has a landscape quadrangular shape as a whole. The liquid crystal display device 10 is housed in a vertical position such that a display surface 11a is arranged along the vertical direction (the Y-axis direction).

The description that "the display surface 11a of the liquid crystal panel 11 is arranged along the vertical direction" is not limited to a configuration that the display surface 11a of the liquid crystal panel 11 is arranged to be parallel to the vertical direction but includes a configuration that the display surface 11a is relatively along the vertical direction rather than the horizontal direction. For example, the display surface 11a may be inclined by 0 to 45 degrees, preferably 0 to 30 degrees with respect to the vertical direction.

FIG. 2 is an exploded perspective view illustrating a general construction of the liquid crystal display device 10. As illustrated in FIG. 2, the liquid crystal display device 10 includes the liquid crystal panel 11 that is a display panel, and a backlight unit 12 that is a lighting device. The liquid crystal panel 11 and the backlight unit 12 are integrally supported by a bezel 13 that is formed in a frame shape.

The liquid crystal panel has a rectangular plan view shape and is configured such that a pair of glass substrates is bonded together with a predetermined gap therebetween and liquid crystals are sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R, G and B color sections arranged in a predetermined pattern, counter electrodes, and an alignment film and the like are provided. Polarizing plates are attached to outer surfaces of the glass substrates.

As illustrated in FIG. 2, the backlight unit 12 includes a chassis 14 that is open toward a light exit surface side (toward the liquid crystal panel 11). Within the chassis 14, the backlight unit 12 includes a linear light source, a light guide member 19, a refection sheet 20, and an optical member 15 set. The linear light source is configured with a plurality of LED boards 18 that are light emitting units. The LED boards 18 are provided on each long side of the chassis 14. The light guide member 19 guides light from the linear light source toward the liquid crystal panel 11. The reflection sheet 20 reflects the light traveling through the light guide member 19 toward the front-surface side. The optical member 15 set is provided to cover the opening of the chassis 14.

The chassis is made of metal and includes a bottom plate 14a and a pair of side plates 14b as illustrated in FIG. 2. The bottom plate 14a is formed in a rectangular shape similar to the liquid crystal panel 11, and the side plates 14b are lifted up from outer ends of the long sides of the bottom plate 14a. A positioning pin 23 is integrally provided on the bottom plate 14a and positions the reflection sheet 20, the light guide member 19, and the optical member 15 with respect to the X-axis direction and the Y-axis direction. The LED boards 18 that are the linear light sources are mounted to the side plates 14b with screws and a frame 16 and the bezel 13 are mounted to the side plates 14b with screws.

The optical member 15 is formed in a rectangular plan view shape similar to the liquid crystal panel 11 and the chassis 14. The optical member 15 is provided on the light exit side surface of the light guide member 19 and provided between the liquid crystal panel 11 and the light guide member 19. As illustrated in FIG. 2, the optical member 15 includes a diffuser 15a provided close to the light guide member 19 and an optical sheet 15b provided close to the liquid crystal panel 11. The optical sheet 15b may be a diffuser sheet, a lens sheet, a polarizing sheet and one of them is selected. In FIGS. 4 and 8 to 10, the optical member 15 set is simplified and only one sheet is illustrated.

As illustrated in FIG. 2, the frame 16 is formed in a frame shape extending along an outer peripheral edge of the light guide member 19 and the optical member 15. The frame 16 presses the substantially entire outer peripheral ends of the light guide member 19 and the optical member 15 from the front surface side. The frame 16 receives the outer peripheral end of the liquid crystal panel 11 from the rear surface side. The frame 16 is made of synthetic resin and has a black surface to have a light shielding property.

As described above, the backlight unit 12 includes the light guide member 19 provided between the linear light sources and is an edge-light type. Each component of the backlight unit 12 will be explained in detail.

Figure 3:
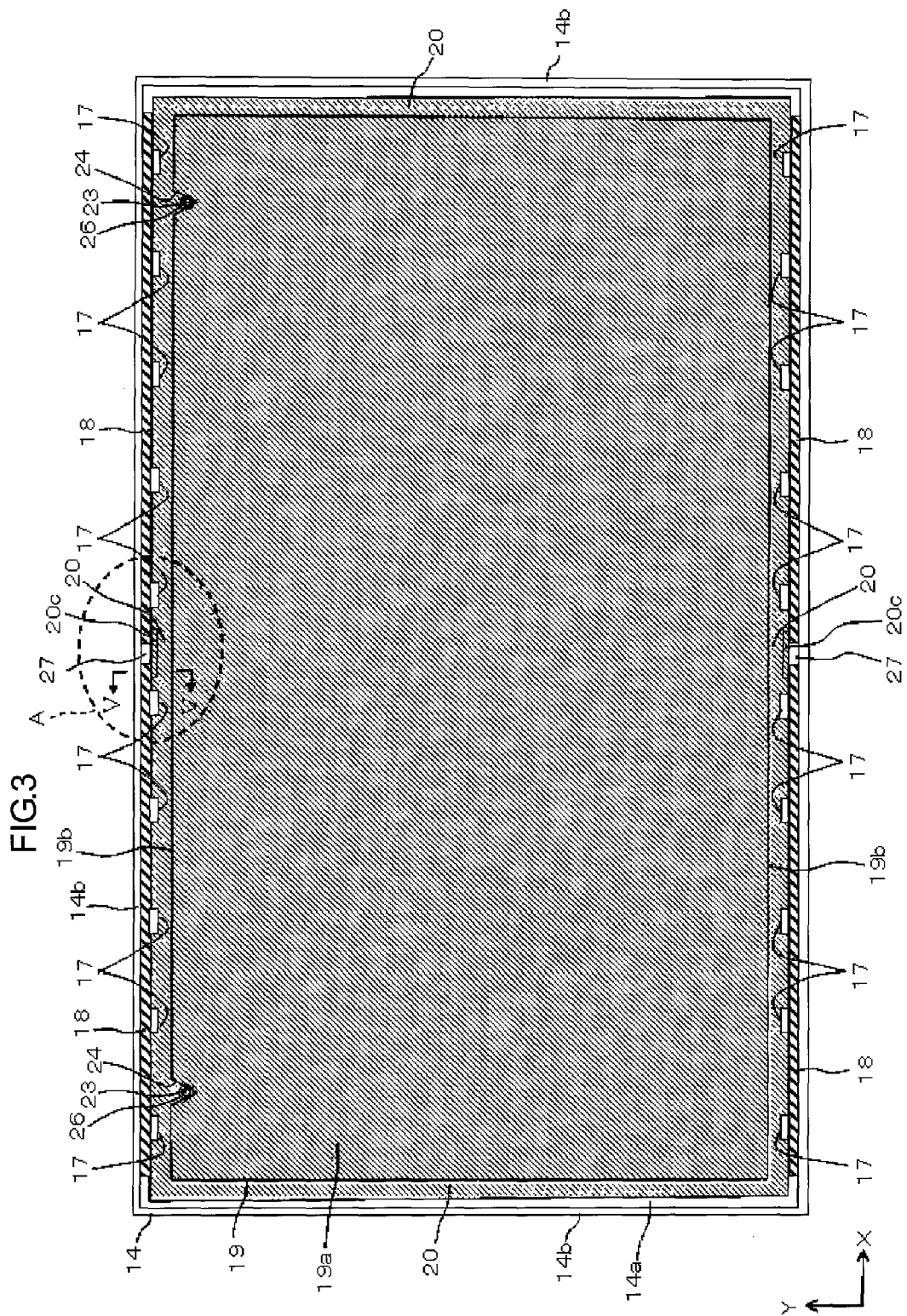
FIG. 3 is a plan view illustrating a chassis of a backlight unit in which a light guide member and an LED board are housed.

FIG. 3 is a plan view illustrating the backlight unit 12 seen from the liquid crystal panel 11 side. As illustrated in FIG. 3, the linear light source is configured with a plurality of light emitting units and the linear light source is arranged on an upper end portion and a lower end portion to sandwich the light guide member 19 in the chassis 14. For example, two LED boards 18 are arranged along one long side of the chassis 14. Each LED board 18 is formed in an elongated plate member made of synthetic resin such as an epoxy resin or ceramics and a wiring pattern is formed on a surface of the LED board 18 via an insulating layer.

A plurality of light emitting components are mounted linearly on each of the LED boards 18 along its longitudinal direction. For example, five LEDs 17 are arranged at intervals on the LED board 18. The LEDs 17 are arranged at substantially equal intervals including the gap between the LED boards 18. Each LED 17 is configured with a LED chip that is arranged on the LED board 18 and enclosed by resin. The LED 17 has a light emitting surface on a surface opposite to a mount surface that is mounted on the LED board 18 and the LED 17 is a top-type LED.

Each LED board 18 including a plurality of LEDs 17 thereon is mounted to the side plate 14b by screws within the chassis 14 such that the light emitting surfaces of the LEDs 17 face the side surface (a light entrance surface) of the light guide member 19.

As described above, the linear light source includes a plurality of LED boards 18 and each of the LED boards 18 has a shortened longitudinal dimension. Accordingly, each LED board 18 is less likely to have influence by warping caused by thermal expansion. The number of LEDs 17 mounted on each LED board 18 is reduced and this lowers a drive voltage and reduces a load on a drive circuit.

The light guide member 19 is made of a synthetic resin material having a refraction index greater than air and being capable of high light transmissive such as acrylic. The light guide member 19 is formed in a plate shape having a rectangular plan view shape. The light guide member 19 is arranged directly below the liquid crystal panel 11 and the optical member 15 within the chassis 14. As illustrated in FIG. 3, the light guide member 19 is arranged between the linear light sources each of which is provided on each of the upper and lower ends of the chassis 14.

The light from the LEDs 17 enters an end surface of the light guide member 19 and the light travels through the light guide plate 19. The reflection sheet 20 provided on the rear-surface side directs the light traveling through the light guide plate 19 toward the optical member 15 and the light exits from the light guide member 19. The light guide member 19 has a plan view size substantially same as the optical member 15, and the outer peripheral end portions of the light guide member 19 are pressed indirectly by the frame 16 via the optical member 15 from the front-surface side.

Figure 4:
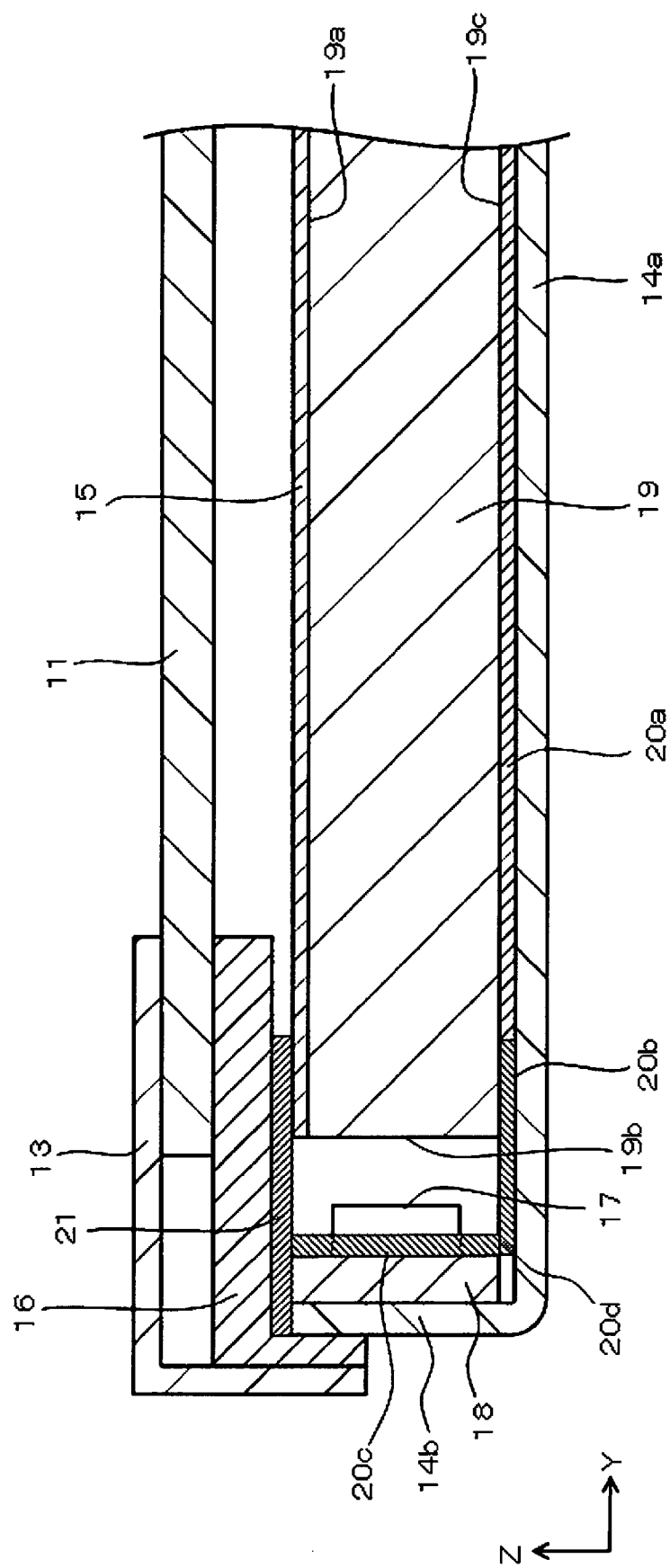
FIG. 4 is a cross-sectional view taken along a V-V line in FIG. 3.

FIG. 4 is a cross-sectional view taken along a V-V line in FIG. 3. In FIG. 4, an upper side corresponds to the front surface side and a lower side corresponds to the rear surface side. As illustrated in FIG. 4, a surface of the light guide member 19 facing the front-surface side is a light exit surface 19a from which the light traveling through the light guide member 19 exits toward the optical member 15 and the liquid crystal panel 11. An end surface of the outer peripheral end surfaces of the light guide member 19 that faces the LEDs 17 with a predetermined distance is a light entrance surface 19b that the light from the LEDs 17 enters.

A first reflection sheet 20a is provided on a surface 19c of the light guide member 19 that is opposite to the light exit surface 19a so as to cover an entire surface 19c. The first reflection sheet 20a reflects light traveling through the light guide member 19 toward the front-surface side. A second reflection sheet 20b is provided on a portion that corresponds to the rear-surface side of the space between the LEDs 17 and the light entrance surface 19b. The second reflection sheet 20b reflects light from the LEDs 17 within the space without leaking the light to outside the space. The reflection sheet 20 is configured with the first reflection sheet 20a and the second reflection sheet 20b and they may integrally configure the reflection sheet 20a.

The reflection sheet 20 is made of at least one of polycarbonate, polyvinyl chloride, polyurethane, polyethylene, polypropylene, and polyethylene terephthalate. The material of the reflection sheet 20 is not limited thereto. White PET is preferably used as a material of the reflection sheet 20. A reflection surface (a surface facing the light guide surface) of the reflection sheet 20 may be roughened and a surface roughness is adjusted to improve brightness of the liquid crystal panel.

On at least one of the light exit surface 19a and the opposite surface 19b of the light guide member 19, reflection portions (not illustrated) or scattering portions (not illustrated) are arranged in a certain pattern to have a predetermined distribution in a surface area. The reflection portions reflect the light traveling through the light guide member 19 and the scattering portions scatter the light. With this configuration, the light exits from the light exit surface 19a at an even distribution in a surface area.

FIG. 5 is an enlarged plan view illustrating a portion A in FIG. 3 (a portion close to the gap 27 between the LED boards 18). A reflection cover 20c and operations and effects thereof will be explained with reference to FIGS. 4 and 5.

As illustrated in FIGS. 4 and 5, the reflection cover 20c is provided corresponding to the gap 27 generated between the LED boards 18 and close to the light guide member. The reflection cover 20c is provided on the surface of the LED boards 18 facing the light guide member to cover the gap 27. The reflection cover 20c reflects the light traveling toward the gap 27 and guides the light to the light entrance surface 19b of the light guide member 19. Therefore, the reflection sheet 20c is made of a material having reflectance higher than light reflectance occurring in the gap 27. In FIG. 4, the reflection cover 20c is formed integrally with the reflection sheet 20. An end part of the second reflection sheet 20b is extended outside to form the reflection cover 20c and the reflection cover 20c is bent at a bending portion 20d to overlap the gap 27.

A width (a dimension in the X-axis direction) of the reflection cover 20c is greater than a dimension of the gap 27 that is a distance between the LED boards 18 and is smaller than the interval between the LEDs 17. A height (a dimension in the Z-axis direction) of the reflection cover 20c is substantially same as a height (a dimension in the Z-axis direction) of the LED board 18. Thus, the reflection cover 20c is formed in substantially a square shape.

As illustrated in FIG. 5, like the related art, the light guide member 19 includes a lighting area LA which the light from the LEDs 17 directly enters and a non-lighting area NLA which the light indirectly enters from its surroundings. The light 28b reflecting off the facing surface of the LED board 18 enters the non-lighting area NLA to increase the amount of light in the non-lighting area NLA.

In the related art, the light reflectance is lowered at the gap 27 between the LED boards 18 and the dark portion is generated in the non-lighting area NLA. However, in the present embodiment, the reflection cover 20c is provided on the light guide member side of the gap 27 and the light reflectance is less likely to be lowered in the gap 27.

Therefore, the light 28a entering the reflection cover 20c is reflected by the reflection cover 20c and the reflected light 28b enters the non-lighting area NLA without decreasing the amount of light. This ensures the amount of light indirectly entering the non-lighting area NLA facing the gap 27. This reduces difference between the amounts of the indirect light in the non-lighting area NLA facing the LED board 18 and the indirect light in the non-lighting area NLA facing the gap 27. Accordingly, the dark portion is less likely to be locally generated and uneven brightness is less likely to be caused.

In the above embodiment, the reflection cover 20c and the reflection sheet 20 (the first reflection sheet 20a, the second reflection sheet 20b) are formed integrally with each other. However, the reflection cover 20c may be provided separately from the reflection sheet 20. If the reflection cover 20c is independently provided, the reflection cover 20c is arranged to cover the gap 27 entirely and then, the portion of the reflection cover 20c overlapping the LED board 18 may be fixed by a bonding material such as adhesive. A material of the separately provided reflection cover 20c may be same as that of the reflection sheet 20 and may be same as that of the LED board 18. If the reflection cover 20c and the LED board 18 are made of the same material, they have same light reflectance. Therefore, the amount of indirect light entering the non-lighting area NLA facing the LED board 18 is equal to the amount of indirect light entering the non-lighting area NLA facing the gap 27. Thus, uneven brightness is less likely to be caused.

A third reflection sheet 21 is provided on the front-surface side of the space between the LEDs 17 and the light entrance surface 19b. The third reflection sheet 21 is provided to have the space between the third reflection sheet 21 and the second reflection sheet 20b. The third reflection sheet 21 extends to have substantially an entire length of the long side of the frame 16. The second reflection sheet 20b and the third reflection sheet 21 are provided to also sandwich the end portion of the light guide member 19 close to the LEDs 17 therebetween. With this configuration, the light from the LEDs 17 is reflected repeatedly by the reflection sheets 20b, 21 and the light enters the light entrance surface 19b effectively without leaking outside of the space.

If a power of the above-described liquid crystal display device 10 is turned on, driving of the liquid crystal panel 11 is controlled by a control circuit (not illustrated). Drive power is supplied to each of the LEDs 17 on the LED board 18 from the power supply board (not illustrated) to control the driving. The light from each LED 17 is guided by the light guide member 19 and the liquid crystal panel 11 is irradiated with the light via the optical member 15 to display a desired image on the liquid crystal panel 11.

In the backlight device 12 of the present embodiment, the liquid crystal panel 11 is irradiated with light having even brightness. This achieves display with excellent display quality in the liquid crystal display device 10. Such a liquid crystal display device 10 can be applied to various usages such as a display of a television or a personal computer and preferably applied to a large screen.

SECOND EMBODIMENT

In a second embodiment, the reflection cover 20c is provided integrally with the reflection sheet 20. In the second embodiment, the same numerals or symbols are applied to parts same as in the above embodiment and they will not be explained.

Figure 6A:
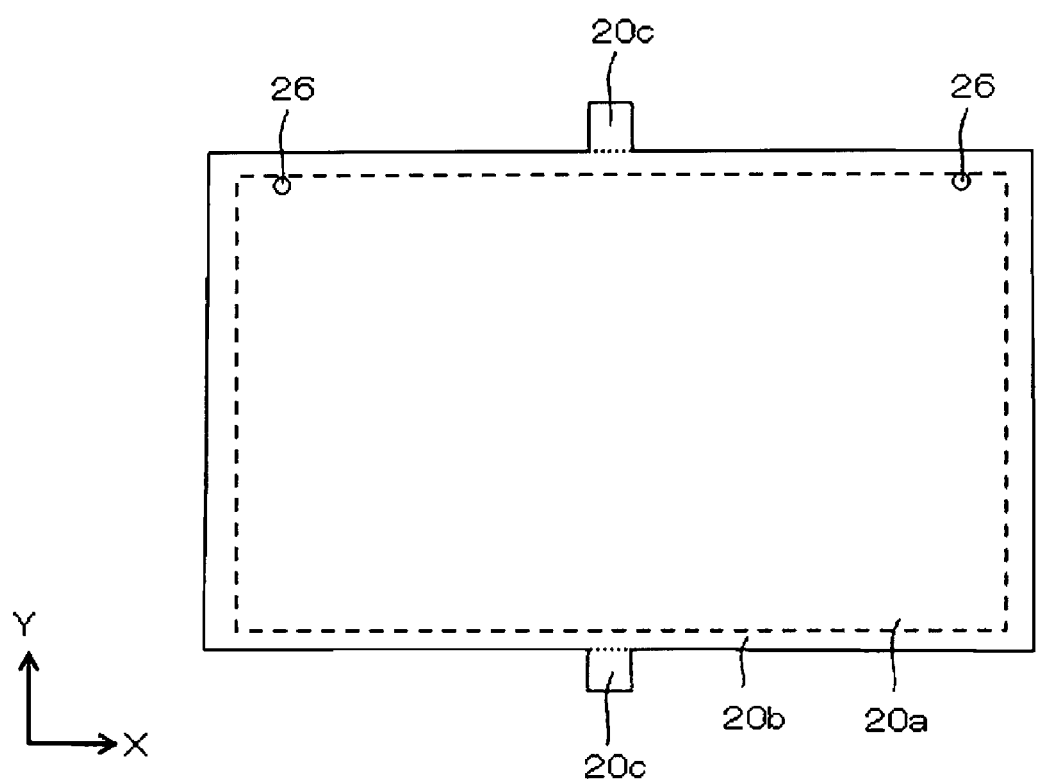
FIG. 6a is a plan view illustrating one modification of the reflection cover.

FIG. 6a is a plan view illustrating the reflection cover 20c and the reflection sheet 20 that are integrally formed. The reflection sheet 20 includes through holes 26 that are used to position the reflection sheet 20 with respect to the chassis 14. The reflection covers 20c covering the gaps 27 between the LED boards 18 are formed integrally with the reflection sheet 20. Each of the LED boards 18 may have a different size or a different shape. The gap 27 is not necessarily provided in a middle portion of the linear light source. The reflection cover 20c is provided at an edge portion of the reflection sheet 20 corresponding to the gap 27. A width (a dimension in the X-axis direction) of the reflection cover 20c is greater than a size of the gap 27 or a distance between the LED boards 18 and is smaller than the interval between the LEDs 17. A height (a dimension in the Y-axis direction) of the reflection cover 20c is substantially same as a height (a dimension in the Z-axis direction) of the LED board 18.

Figure 6B:
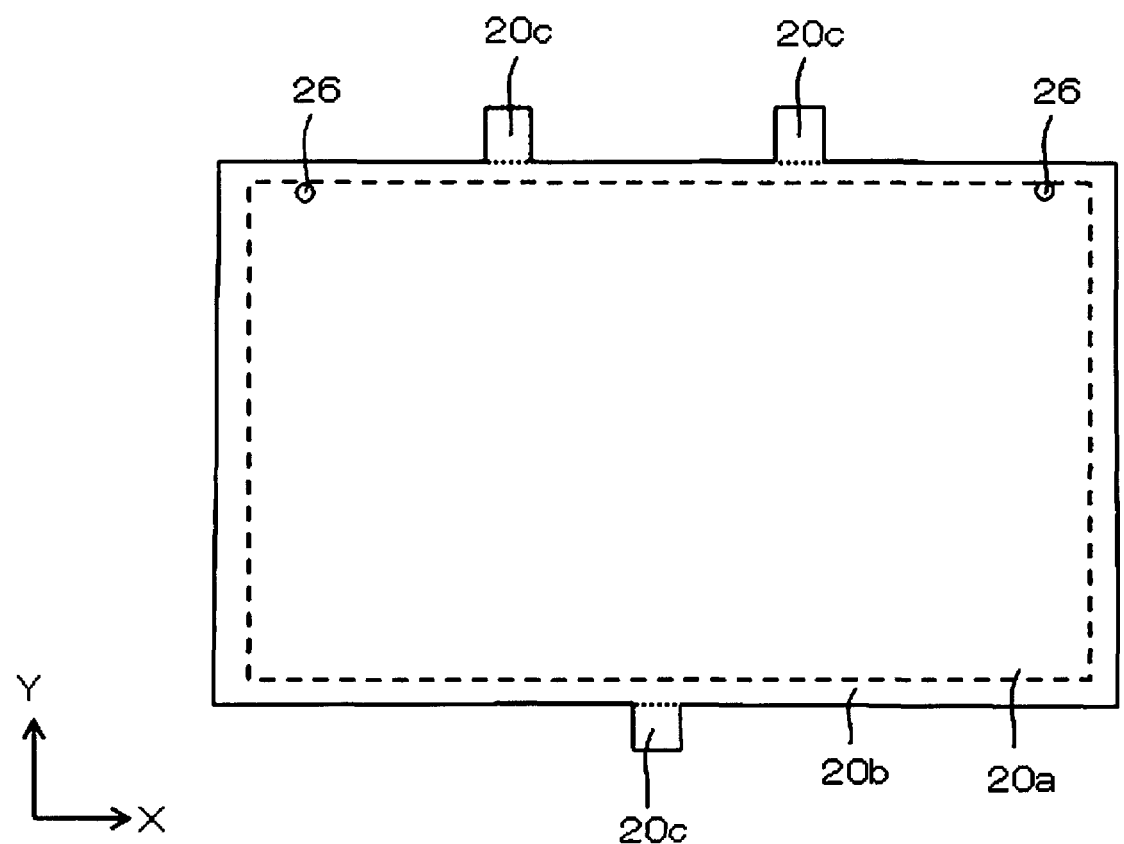
FIG. 6b is a plan view illustrating another modification of the reflection cover.

In FIGS. 6a and 6b, the reflection covers 20c extend from edge portions of the reflection sheet 20 to outside. In such a projection type reflection cover 20c, the desired edge portions of the reflection sheet 20 are extended to form the reflection covers 20c. Therefore, the reflection cover 20c and the reflection sheet 20 are integrally formed without increasing the material cost for the reflection sheet 20.

Figure 6C:
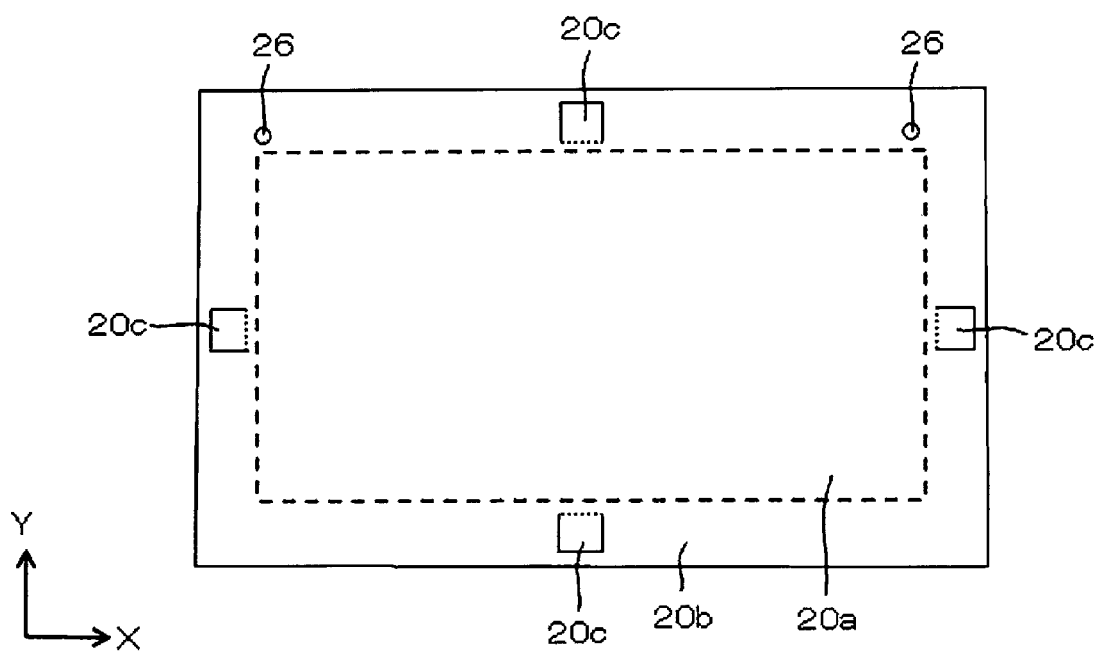
FIG. 6c is a plan view illustrating additional modification of the reflection cover.
Figure 6D:
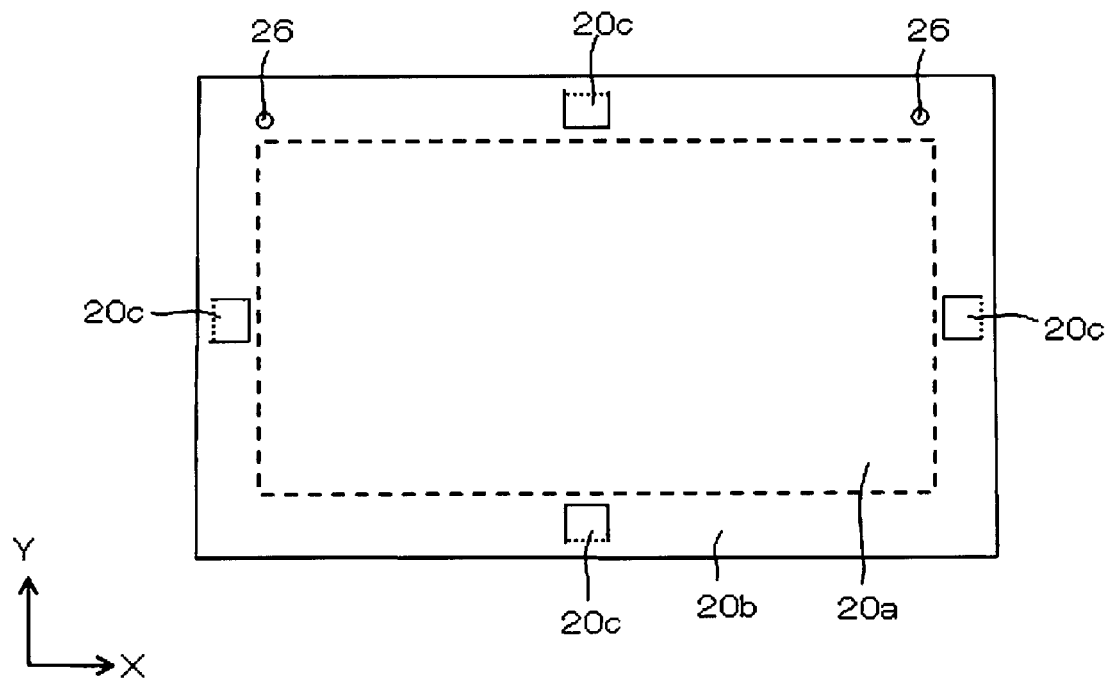
FIG. 6d is a plan view illustrating additional modification of the reflection cover.

In FIGS. 6c and 6d, the reflection covers 20c are formed by cutting in inner edge portions of the reflection sheet 20. In such a cut-in type reflection cover 20c, an entire size of the reflection sheet 20 is increased and no projection portion is formed. Therefore, the reflection cover 20c may not be caught by any other parts and damaged by mistake and has good workability.

Figure 7A:
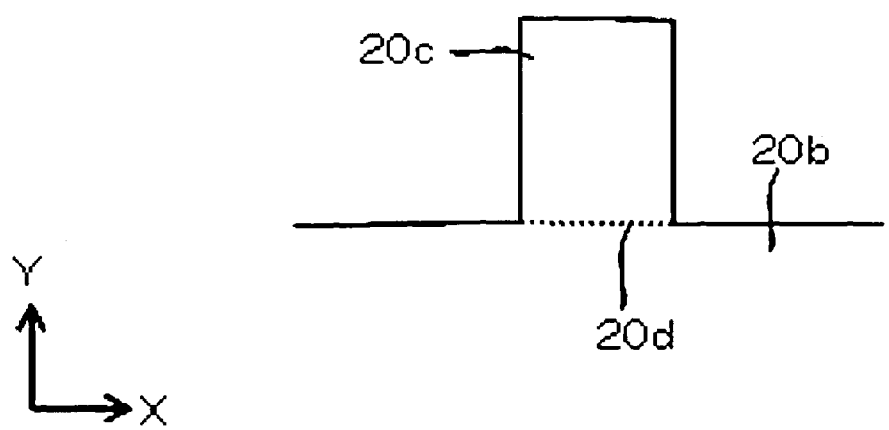
FIG. 7a is an enlarged plan view illustrating a portion A (a gap between LED boards) in FIG. 3.

FIG. 7a is an enlarged plan view illustrating the reflection cover 20c. In both of the projection type reflection cover and the cut-in type reflection cover, the reflection cover 20c is lifted up vertically to correspond to the gap 27. A bending portion 20d is provided at a border between each reflection cover 20c and the reflection sheet 20. Perforations or a half-cut groove may be formed at the bending portion 20d such that the reflection cover 20c is bent at a correct position to be arranged close to the gap 27.

As illustrated in FIG. 4, in the projection type reflection cover 20c, the reflection cover 20c is bent upwardly at the bending portion 20d and accordingly, the reflection cover 20c is provided along the lighting surface of the LED board 18 to overlap the gap 27. The reflection cover 20c is fixed integrally with the reflection sheet 20 and is not necessary to be fixed to the LED board 18 by adhesive. This facilitates assembling work.

Figure 8:
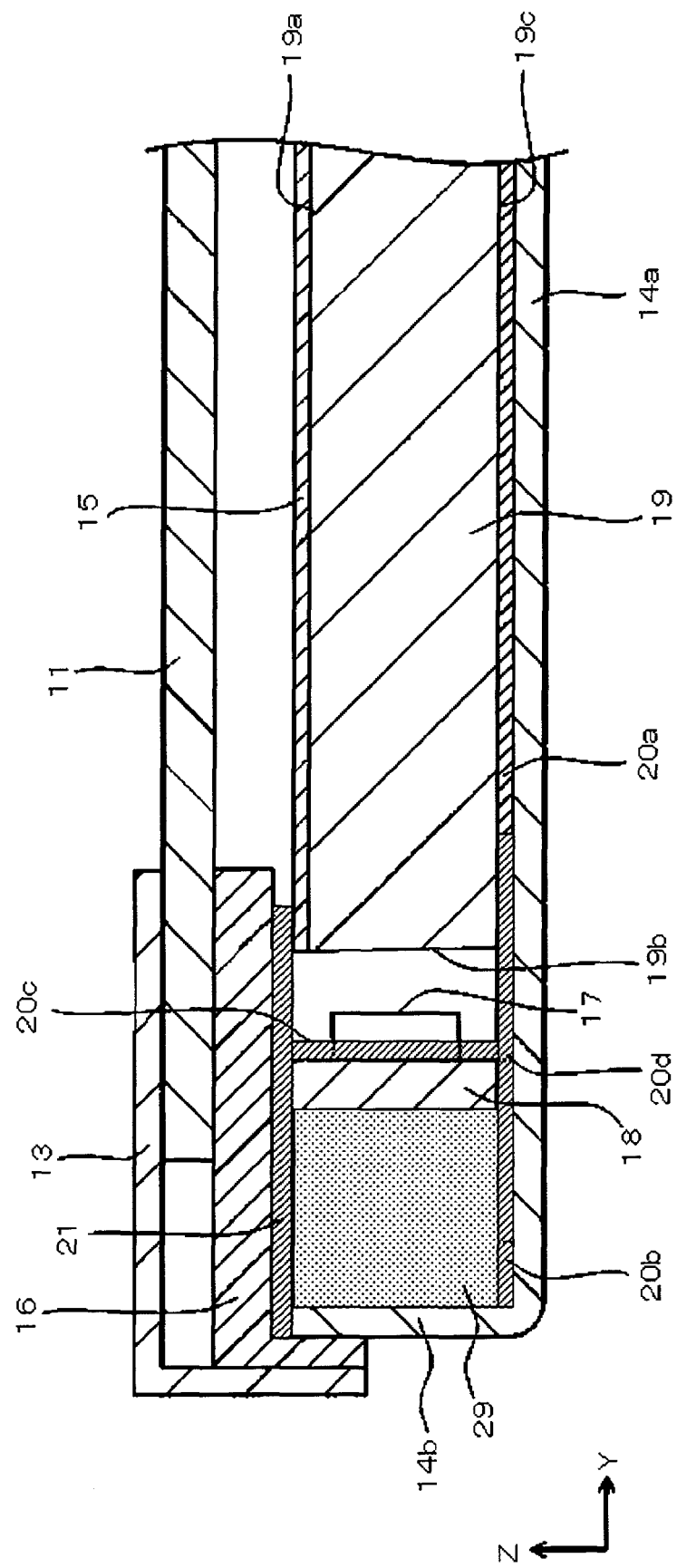
FIG. 8 is a cross-sectional view taken along the V-V line in FIG. 3 according to one modification.

FIG. 8 is a cross-sectional view illustrating the cut-in type reflection cover 20c. As illustrated in FIG. 8, the cut-in type reflection cover 20c is used in the configuration in which the LED board 18 is arranged far from the chassis 14 (the side plate 14b). In such a configuration, a cooling member 29 such as a metal block is provided between the LED board 18 and the side plate 14b and the cooling member 29 cools down the LED board 18.

As illustrated in FIG. 8, the cut-in type reflection cover 20c is bent at the bending portion 20d and lifted vertically along the lighting surface of the LED board 18 to overlap the gap 27. The portion of the reflection cover 20c extending outside the bending portion 20d is arranged below the LED board 18 and the cooling member 29. With this configuration, the extended portion of the reflection sheet 20 is in contact with the cooling member 29 to be cooled down and the deformation of the reflection sheet 20 such as wrinkles or loosening caused by its thermal expansion is less likely to be caused.

Figure 7B:
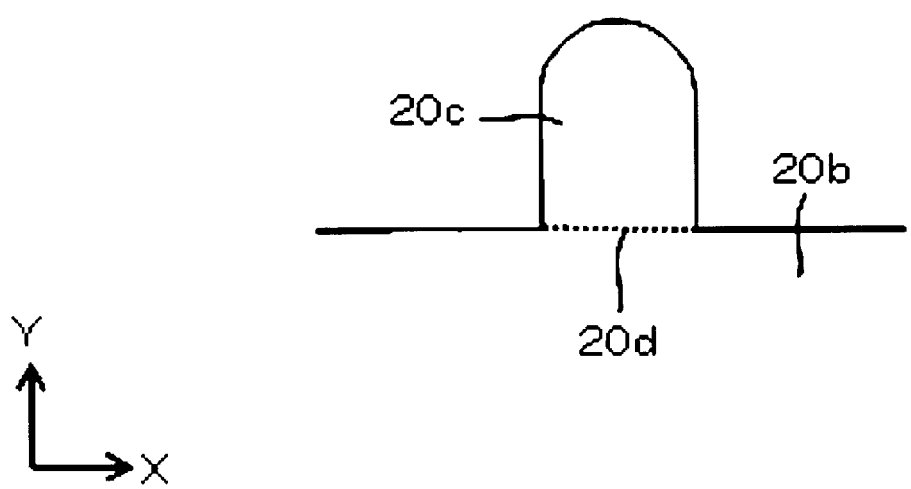
FIG. 7b is an enlarged plan view illustrating the portion A (a gap between LED boards) in FIG. 3 according to one modification.
Figure 7C:
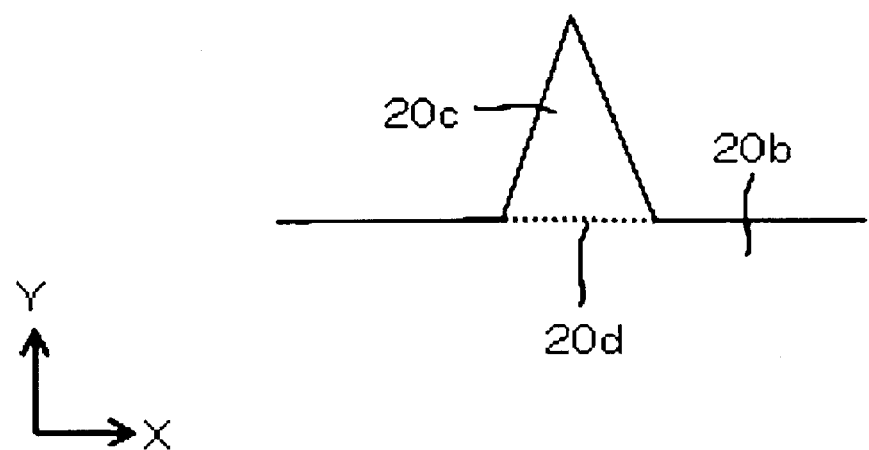
FIG. 7c is an enlarged plan view illustrating the portion A (a gap between LED boards) in FIG. 3 according to another modification.

As illustrated in FIGS. 7a to 7c, the reflection cover 20c may be formed in a square (FIG. 7a), substantially an arc (FIG. 7b), or substantially a square (FIG. 7c) and a shape of the reflection cover 20c may be any shape as long as the reflection cover 20c has an area that covers at least an entire gap 27. If the reflection cover 20c is formed in substantially an arc (FIG. 7b) or substantially a triangle (FIG. 7c), the area of the reflection cover 20c is reduced and this reduces a material cost of the reflection sheet 20.

Figure 7D:
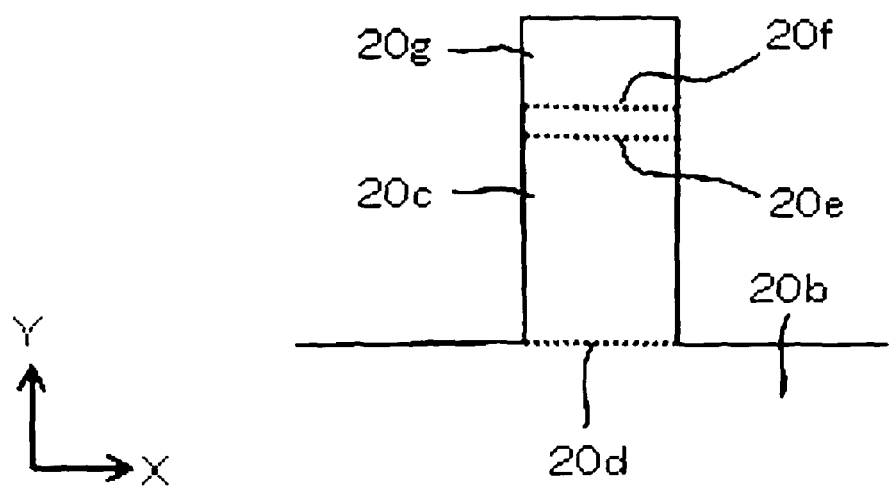
FIG. 7d is an enlarged plan view illustrating the portion A (a gap between LED boards) in FIG. 3 according to an additional modification.
Figure 7E:
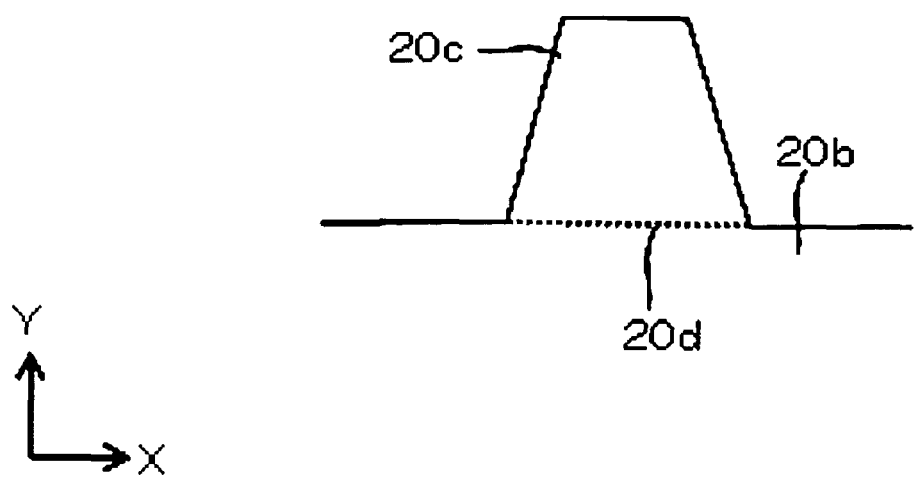
FIG. 7e is an enlarged plan view illustrating the portion A (a gap between LED boards) in FIG. 3 according to an additional modification.
Figure 7F:
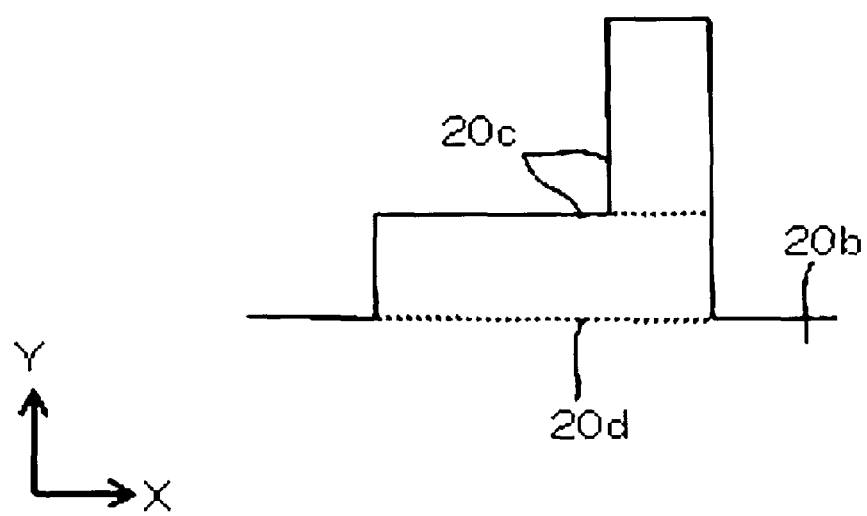
FIG. 7f is an enlarged plan view illustrating the portion A (a gap between LED boards) in FIG. 3 according to an additional modification.
Figure 7G:
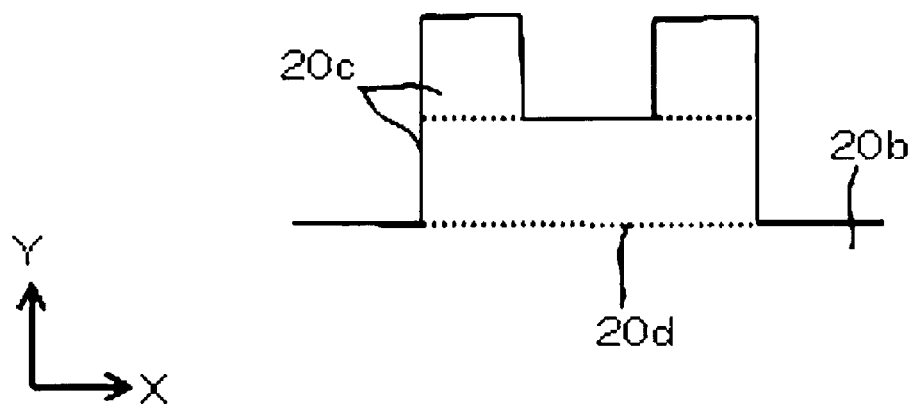
FIG. 7g is an enlarged plan view illustrating the portion A (a gap between LED boards) in FIG. 3 according to an additional modification.
Figure 7H:
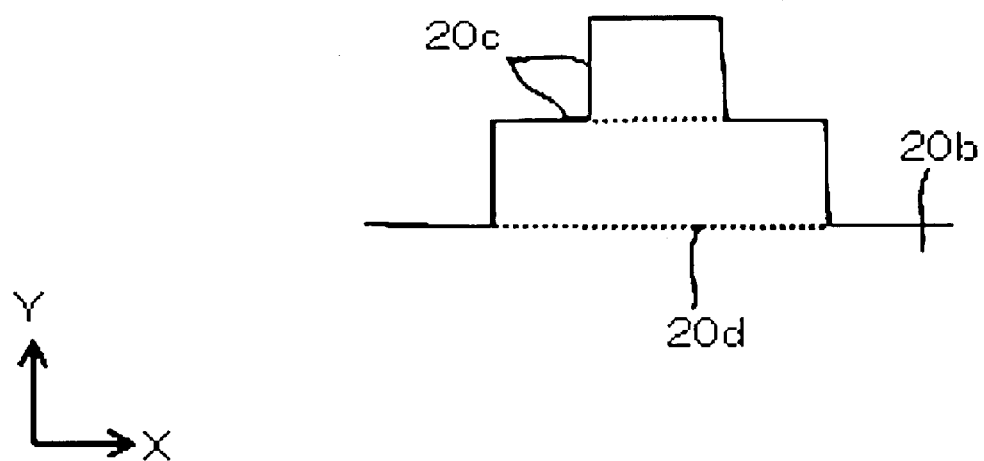
FIG. 7h is an enlarged plan view illustrating the portion A (a gap between LED boards) in FIG. 3 according to an additional modification.

In FIG. 7d, the reflection cover 20c is further extended and has an extended portion 20g and a plurality of bending portions 20e, 20f. The reflection cover 20c is bent at the bending portions and provided along the front-surface side (the light guide member side) and the rear-surface side of the LED board 18 to overlap with each other. With this configuration, the reflection cover 20c is fixed to the LED board 18 stably without using an adhesive material.

Figure 9:
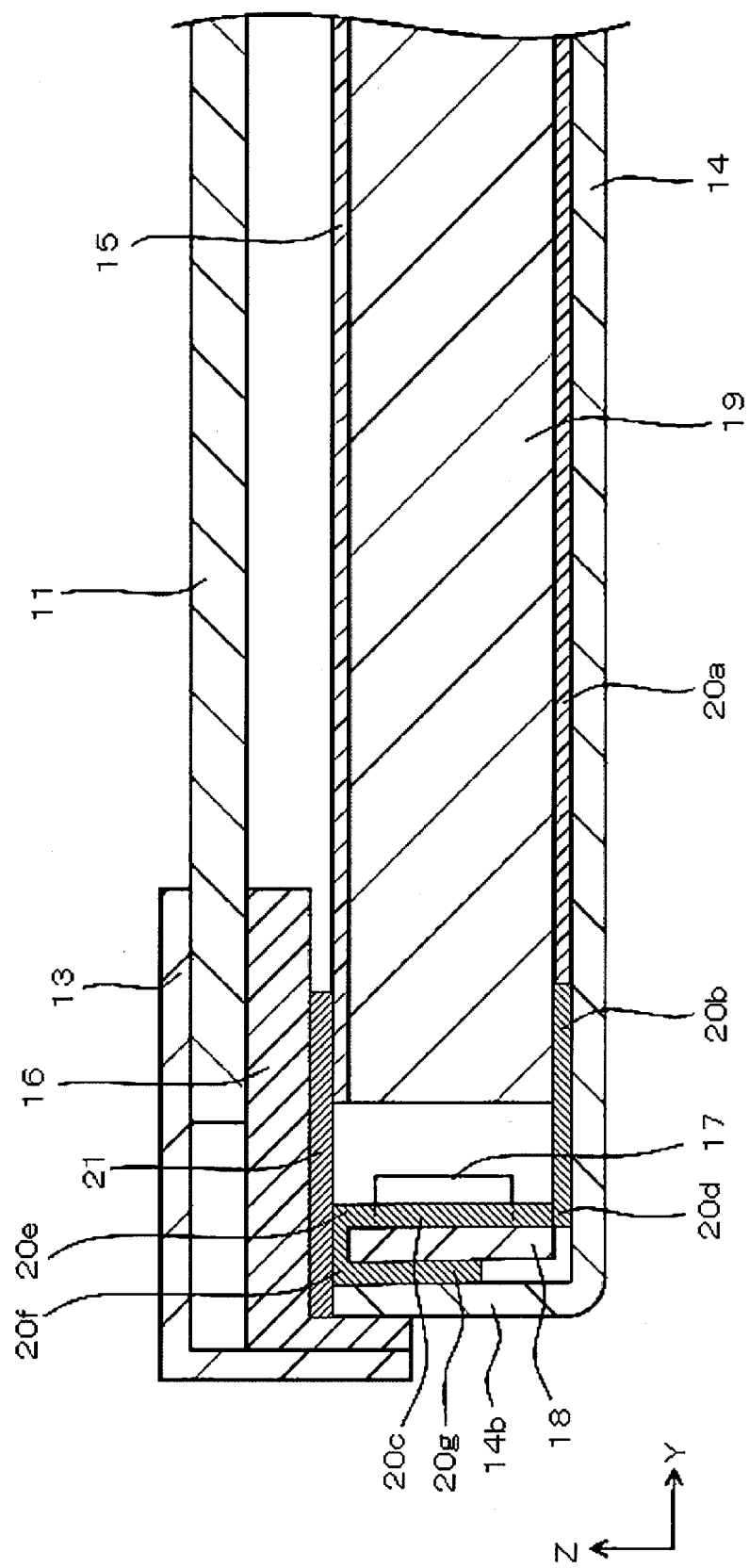
FIG. 9 is a cross-sectional view taken along the V-V line in FIG. 3 according to another modification.

As illustrated in FIG. 9, the reflection cover 20c is lifted vertically at the bending portion 20d and provided along the surface side of the gap 27 between the LED boards 28. Then, the reflection cover 20c is folded at the bending portions 20e, 20f and provided along the rear side of the gap 27 between the LED boards 18. The extended portion 20g is sandwiched between the LED board 18 and the side plate 14b of the chassis and the LED board 18 and the side plate 14b of the chassis are fixed by screws. Accordingly, the extended portion 20g is securely fixed and the reflection cover 20c is less likely to be moved from a correct position. A part of the reflection cover 20 may be fixed to the side plate 14b of the chassis by adhesive to fix it more firmly.

Figure 10:
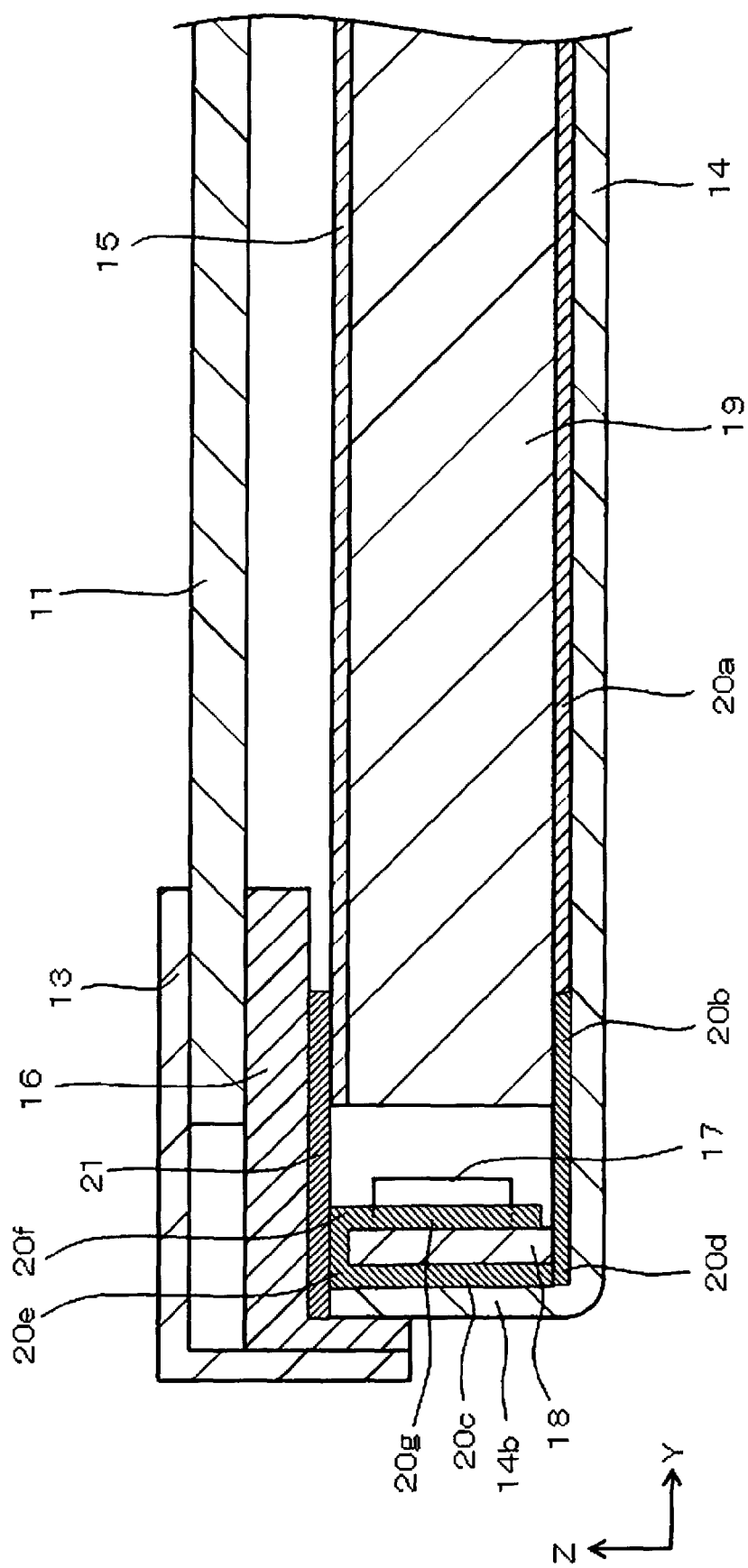
FIG. 10 is a cross-sectional view taken along the V-V line in FIG. 3 according to an additional modification.

As illustrated in FIG. 10, the reflection cover 20c may be lifted up vertically at the bending portion 20d and provided along the rear side of the gap 27 between the LED boards 18. Then, the reflection cover 20c may be folded at the bending portions 20e, 20f toward the front side of the gap 27 between the LED boards 18. The gap 27 is covered by the extended portion 20g and the reflection cover 20c is sandwiched between the LED board 18 and the side plate 14b of the chassis. The LED board 18 and the side plate 14b of the chassis are fixed by screws. Accordingly, the reflection cover 20c is securely fixed and the reflection cover 20c is less likely to be moved from a correct position. A part of the reflection cover 20 may be fixed to the side plate 14b of the chassis by adhesive to fix it more firmly.

The extended portion 20g of the reflection cover 20c illustrated in FIG. 7d may be formed in substantially an arc shape (FIG. 7b) or in substantially a triangle shape (FIG. 7c). If the extended portion 20g is formed in substantially an arc shape or a triangle shape, a corner of the extended portion does not hit any other parts and the extended portion 20g is easily inserted to a space between the LED board 18 and the side plate 14b of the chassis.

Figure 7I:
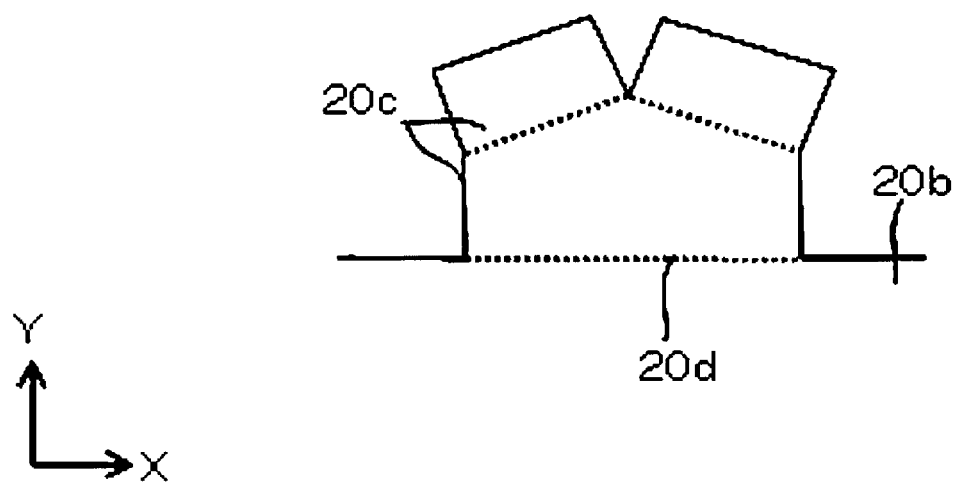
FIG. 7i is an enlarged plan view illustrating the portion A (a gap between LED boards) in FIG. 3 according to an additional modification.

In the first embodiment, a part of reflection cover covering the gap is formed in substantially a square shape but may be formed in a tapered shape (FIG. 7e) such that the part is narrowed as is farther away from the bottom surface of the chassis that supports the light emitting unit or may be formed in substantially an L shape (FIG. 7f), substantially a recess (FIG. 7g), substantially a projection (FIG. 7h), or may be formed in two separated parts at its distal end portion (FIG. 7i).

Other than the shapes of the portion of the reflection cover covering the gap as illustrated in FIGS. 7a to 7i, the portion may be formed with a curved periphery. The shape of the portion formed with straight lines is easily processed with plotter cutting. The shape of the portion formed with a curved periphery is easily processed with punching.

In the first embodiment, the number of the LEDs 17 arranged on each of the light emitting units is equal to each other and the LEDs 17 are arranged on each of the light emitting units at equal intervals. However, the number of the LEDs 17 arranged on each of the light emitting units may be different and the LEDs 17 may be arranged on each of the light emitting units at different intervals. With this configuration and the reflection cover 20, display ability is improved and uneven brightness and uneven color are less likely to be caused.

In the first embodiment, the number of the LEDs 17 arranged on each of the light emitting units is equal to each other and the LEDs 17 are arranged on each of the light emitting units at equal intervals. However, the number of the LEDs 17 arranged on each of the light emitting units may be different and the LEDs 17 may be arranged on each of the light emitting units at different intervals. With this configuration and the reflection cover 20, display ability is improved and uneven brightness and uneven color are less likely to be caused.

The LEDs 17 may have different light emission peaks. The LEDs 17 may have different configurations or light distribution characteristics. With this configuration and the reflection cover 20, display ability is improved and uneven brightness and uneven color are less likely to be caused.

The LED 17 is configured with a blue light emitting chip, a green light emitting chip, and a red light emitting chip to emit white light. The LED 17 may include a blue light emitting chip that is coated with a phosphor having a light emission peak in a yellow range and emits white light or may include a blue light emitting chip that is coated with a phosphor having a light emission peak in a green range and a red range and emit white light. The LED 17 may include a blue light emitting chip coated with a phosphor having a light emission peak in a green range and a red light emitting chip and emit white light. With this configuration and the reflection cover 20, display ability is improved and uneven brightness and uneven color are less likely to be caused.

The LED 17 may include an ultraviolet light emitting chip and a phosphor and include an ultraviolet light emitting chip coated with phosphors each having a light emission peak in each of a blue range, a green range, and a red range and emit white light. With this configuration and the reflection cover 20, display ability is improved and uneven brightness and uneven color are less likely to be caused.

The LED 17 may be configured with a phosphor enclosing member formed in a dome or a crater-like shape. With this configuration and the reflection cover 20, display ability is improved and uneven brightness and uneven color are less likely to be caused.

The chip of the LED 17 may be mounted with a flip-chip technology or a wire bonding technology.

EXPLANATION OF SYMBOLS

10: Liquid crystal display device (Display device)
11: Liquid crystal panel (Display panel)
12: Backlight unit (Lighting device)
14: Chassis
16: Frame
17: LED
18: LED board
19: Light guide member
20: Reflection sheet
20c: Reflection cover
27: Gap
100: Television device

The invention claimed is:
1. A lighting device comprising:
a plurality of light emitting units each of which includes a base board and a plurality of light emitting components on the base board;

a linear light source including the plurality of light emitting units that are arranged linearly to have a gap therebetween;

a light guide member having an end portion and provided such that the end portion faces the linear light source;

a reflection sheet configured to reflect light from the linear light source;

a chassis supporting the light guide member, the reflection sheet and the light emitting units; and a reflection cover provided corresponding to the gap between the light emitting units.

2. The lighting device according to claim 1, wherein the reflection cover is provided integrally with the reflection sheet.

3. The lighting device according to claim 2, wherein the reflection cover is extended to outside of an edge portion of the reflection sheet.

4. The lighting device according to claim 3, wherein the reflection cover has a size same as a height of the base board of the light emitting unit and includes a bending portion at which the reflection cover is bent along the base board.

5. The lighting device according to claim 2, wherein the reflection cover is configured by cutting in an inner part of the edge portion of the reflection sheet.

6. The lighting device according to claim 1, wherein the reflection cover is fixed to the light emitting units by adhesive.

7. The lighting device according to claim 1, wherein the reflection sheet has reflectance higher than light reflectance generated in the gap.

8. A display device comprising:

the lighting device according to claim 1; and a liquid crystal display panel including a pair of substrates enclosing liquid crystals therebetween and configured to display using light from the lighting device.

9. A television device comprising the display device of claim 8.

10. The lighting device according to claim 3, wherein the reflection cover is extended further from a height of the base board of the light emitting unit and includes a plurality of bending portions at which the reflection cover is bent and provided along a front side and a rear side of the base board.

11. The lighting device according to claim 10, wherein a part of the reflection cover is sandwiched and fixed by the light emitting unit and the chassis supporting the light emitting unit.

12. The lighting device according to claim 11, wherein the part of the reflection cover is fixed by adhesive to the chassis that supports the light emitting units.

13. The lighting device according to claim 4, wherein a portion of the reflection cover that covers the gap is formed in substantially an arc shape or a triangular shape.

14. The lighting device according to claim 4, wherein a portion of the reflection cover that covers the gap is formed in substantially a square shape.

15. The lighting device according to claim 4, wherein a portion of the reflection cover that covers the gap is formed in substantially an L shape.

16. The lighting device according to claim 4, wherein a portion of the reflection cover that covers the gap is formed in substantially a projection shape.

17. The lighting device according to claim 4, wherein a portion of the reflection cover that covers the gap is formed in substantially a recess shape.

18. The lighting device according to claim 4, wherein a portion of the reflection cover that covers the gap is formed in a tapered shape so as to be narrower as is farther away from a bottom surface of the chassis that supports the light emitting units.

19. The lighting device according to claim 4, wherein a portion of the reflection cover that covers the gap is formed such that a distal end portion thereof is separated into at least two.

20. The lighting device according to claim 4, wherein a portion of the reflection cover that covers the gap has a curved outer periphery.

* * * * *